Dec. 8, 1925.
J. TESSIER
1,564,723
MOTION PICTURE APPARATUS
Filed July 21, 1924
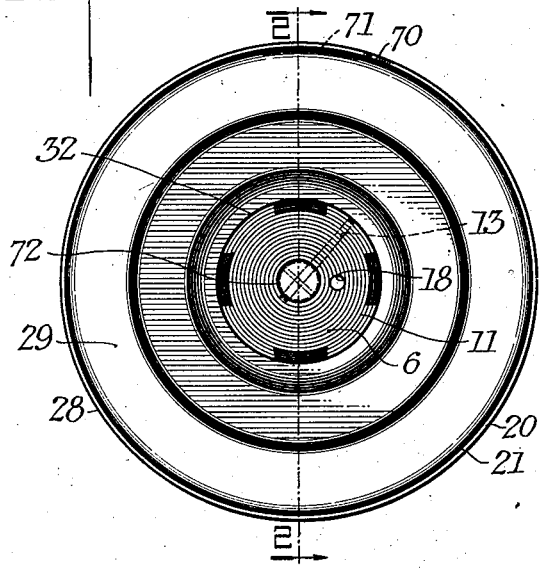
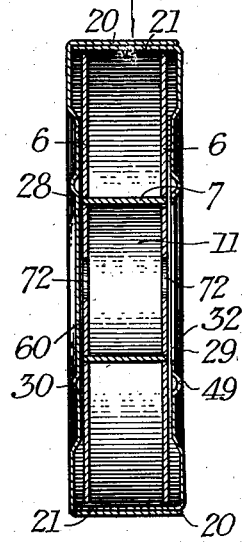
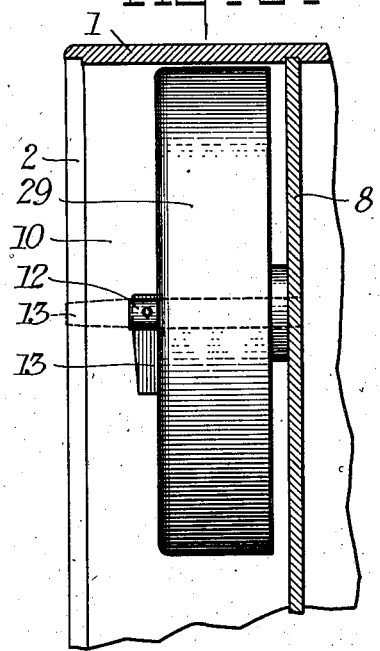
INVENTOR,
Julien Tessier,
BY R. L. Stinchfield
N. M. Perrins
ATTORNEYS Patented Dec. 8, 1925.

1,564,723

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Original application filed February 12, 1923, Serial No. 618,467. Divided and this application filed July 21, 1924. Serial No. 727,102.

To all whom it may concern:

Be it known that I, JULIEN TESSIER, a citizen of the United States of America, residing at Rochester, in the county of Monroe and State of New York, have invented certain new and useful Improvements in Motion-Picture Apparatus, of which the following is a full, clear, and exact specification.

My invention relates to motion picture apparatus and more particularly to a film magazine and a cooperating camera part. This application is a division of my application Serial No. 618,467, filed Feb. 12, 1923.

The main object of my invention is to provide apparatus whereby a reel of film may be transported to and from a camera, and properly positioned therein, with a minimum danger of fogging.

This is attained by the use of a magazine one element of which has a large opening and remains on the reel while it is being inserted into the camera, and of a camera having a shaft with a foldable latch that is insertable through an axial aperture in the reel, the opening in the magazine element being of sufficient size to permit the folding of the latch.

Reference will now be made to the accompanying drawing in which the same reference characters indicate the same parts in all the figures, and in which;

Fig. 1 is an elevation of the film magazine with the camera latch shown in dotted lines;

Fig. 2 is a section on line 2—2 of Fig. 1, showing both elements of the magazine, but no camera parts;

Fig. 3 is a fragmentary section of a camera showing a magazine positioned therein.

The camera has as parts thereof a casing or box 1, one side of which is open at 2 and is adapted to be closed by a suitable door, not shown. The camera is divided longitudinally by a partition 8, on one side of which is a compartment containing mechanism of no present interest, and on the other side of which is a compartment 10 accessible through the open side 2.

A supply shaft 12 is carried by partition 8 and extends into compartment 10, and has at its end a hinged latch 13 which has two positions, one being shown in full lines and one in dotted lines in Fig. 3.

Upon this shaft is rotatably mounted a film reel 11 having side flange members 6 with central apertures 72 loosely fitting the shaft 12 and a core member 7. This reel has an aperture 18 on the side that is uppermost when the reel is positioned on the shaft 12 and that engages a lug, not shown, when the reel is positioned on the take-up shaft, not shown.

The film intended for use is supplied on such reels in magazines of the "pill box" type comprising shallow cylindrical members 28 and 29 the flanges 20 and 21 of which fit one within the other. The cover member 28 has an imperforate side 60 which is ridged as indicated at 30 to add rigidity, and the bottom member 29 has on its side 31 similar ridges 49 and an axial opening 32 of greater radius than the effective length of latch 13. In this magazine the reel 11 fits rather closely. Slots 70, 71 are provided in the flanges 20 and 21. For clearness the film is not shown in Fig. 2.

In using the magazine herein described the operator first removes the cover 28. The reel 11 in the box member 29 is placed in the camera, the apertures 72 of the reel being placed on the shaft, which extends past the member 29, this being left on the reel as long as possible as an additional protection against light. The latch is then turned down, the reel being thus secured in place. When the film has been properly threaded in the camera, the magazine element is removed, this being possible because of the size of the opening 32.

The removal of a full film reel from the camera is by the reverse process, a member 29 being placed over the reel and latch, the latch opened and the reel and magazine member removed together.

A process for loading and unloading a camera in which my improved apparatus is particularly useful is disclosed in the patent to Capstaff No. 1,510,738, granted October 7, 1924.

It is to be understood that I contemplate as within the scope of my invention such modifications and equivalents as fall within the terms of the appended claims.

Having thus described my invention, what I claim as new and desire to secure by Letters Patent is:

1. In motion picture apparatus, a fixed frame, a shaft fixed in position and extending from said frame, a reel with an axial opening adapted to be placed on said shaft, a fastening means adapted to hold the reel on the shaft, and a containing element for said reel formed to be positioned over said reel by movement in a direction parallel to the shaft and said fastening means or to be removed therefrom while said fastening means is operative to hold the reel on the shaft.

2. In motion picture apparatus, a frame, a shaft extending from said frame, a reel with an axial opening adapted to be placed on said shaft, a fastening means on the end of the shaft having a position permitting the positioning or removal of the reel and having a position securing the reel on the shaft, and a magazine element adapted to contain said reel and formed to be positioned over said fastening means when the latter secures the reel on the shaft.

3. In motion picture apparatus, a frame, a shaft extending from said frame, a latch member, a reel with an axial opening adapted to be placed on said shaft and to be held thereon by the latch, a magazine element adapted to contain said reel and having a bottom adapted to overlie the side of the reel and having an opening of greater dimensions than the latch whereby the magazine may be positioned or removed past the latch.

4. In motion picture apparatus, a frame, a shaft extending from said frame, a reel with an axial opening adapted to be positioned on said shaft, a latch having a position permitting the positioning or removal of the reel with respect to the shaft and a position securing the reel on the shaft, and a magazine element adapted to contain said reel and having a bottom adapted to overlie the reel and having an opening of greater dimension than the latch when in either position, whereby the magazine may be positioned or removed past the latch.

5. In motion picture apparatus, a frame, a shaft extending from said frame, a latch member pivoted at the free end of the shaft and adapted to be swung to two positions, one in alignment with the shaft and one perpendicular thereto, a reel with an axial opening adapted to be placed on said shaft and be held thereon by the latch, a magazine element for said reel and comprising a flange member adapted to surround the periphery of the reel and a bottom member adapted to overlie the side of the reel and having an axial opening of greater radius than the length of the latch.

6. In combination, a reel and a magazine therefor, said reel having an axial opening whereby the reel may be positioned on a shaft and be held thereon by a fastener, and said magazine having separable parts one of which is adapted to contain said reel and having a bottom portion overlying the reel, said bottom portion having an axial opening larger than the opening in the reel, whereby it may be positioned or removed over said fastener.

7. In combination, a reel and a magazine therefor with two telescoping parts, said reel having an axial opening adapted to be positioned on a suitable shaft and to be held thereon by a fastener, and one part of said magazine being adapted to remain on said reel as it is thus positioned and comprising a flange member adapted to surround the periphery of the reel and a bottom member adapted to overlie the side of the reel and having an axial opening larger than the opening of the reel, whereby it may be positioned or removed over said fastener.

Signed at Rochester, New York this 17th day of July, 1924.

JULIEN TESSIER.